(12) United States Patent
Yang et al.

(10) Patent No.: US 11,456,140 B2
(45) Date of Patent: Sep. 27, 2022

(54) EARTH LEAKAGE BREAKER AND METHOD FOR CONTROLLING EARTH LEAKAGE BREAKER

(71) Applicant: LS ELECTRIC CO., LTD., Anyang-si (KR)

(72) Inventors: Youngmo Yang, Anyang-si (KR); Sunggyu Nam, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/291,724

(22) PCT Filed: Aug. 19, 2019

(86) PCT No.: PCT/KR2019/010474
§ 371 (c)(1),
(2) Date: May 6, 2021

(87) PCT Pub. No.: WO2020/105844
PCT Pub. Date: May 28, 2020

(65) Prior Publication Data
US 2022/0013318 A1    Jan. 13, 2022

(30) Foreign Application Priority Data
Nov. 19, 2018  (KR) .......................... 10-2018-0142925

(51) Int. Cl.
*H01H 3/02*    (2006.01)
*H01H 3/16*    (2006.01)
(Continued)

(52) U.S. Cl.
CPC ............ *H01H 83/02* (2013.01); *H02H 3/021* (2013.01); *H02H 3/165* (2013.01); *H02H 3/33* (2013.01)

(58) Field of Classification Search
CPC ........ H01H 83/02; H02H 3/021; H02H 3/165; H02H 3/32–33; H02H 3/325
See application file for complete search history.

(56) References Cited

U.S. PATENT DOCUMENTS 7,764,474 B2    7/2010  Kim
10,935,609 B2*  3/2021  Valdes ..................... H02H 7/28
(Continued)

FOREIGN PATENT DOCUMENTS

JP    H0582010 A     4/1993
JP    11299082 A    10/1999
(Continued)

OTHER PUBLICATIONS

International Search Report for related International Application No. PCT/KR2019/010474; report dated May 28, 2020; (5 pages).
(Continued)

*Primary Examiner* — Sisay G Tiku
(74) *Attorney, Agent, or Firm* — K&L Gates LLP

(57) ABSTRACT

The present disclosure relates to an earth leakage circuit breaker and a method for controlling the same. The earth leakage breaker includes a zero-phase current detection unit for detecting a zero-phase current generated in a zero current transformer formed in three-phase electrical lines; a voltage detection unit for detecting a voltage from each of the two electrical lines; a trip unit for tripping contact points between the two electrical lines and a single-phase load when a trip signal is inputted; and a control unit which, when the zero-phase current is detected by the zero-phase current detection unit, detects an electrical line in which the voltage has dropped by a predetermined level or more, and generates and outputs the trip signal to the trip unit when the electrical line in which the voltage has dropped by a predetermined level or more exists.

12 Claims, 7 Drawing Sheets

(51) Int. Cl.
  *H01H 3/32* (2006.01)
  *H02H 3/33* (2006.01)
  *H01H 83/02* (2006.01)
  *H02H 3/02* (2006.01)
  *H02H 3/16* (2006.01)

(56) References Cited

U.S. PATENT DOCUMENTS

| | | | | |
|---|---|---|---|---|
| 11,018,494 | B2* | 5/2021 | Butti | H02H 1/0092 |
| 2017/0328271 | A1* | 11/2017 | Yamashita | F02B 39/10 |
| 2018/0287368 | A1* | 10/2018 | Butti | H03K 21/08 |
| 2019/0331724 | A1* | 10/2019 | Ikushima | G01R 15/185 |
| 2019/0331725 | A1* | 10/2019 | Ikushima | G01R 31/52 |
| 2021/0075210 | A1* | 3/2021 | Wahlroos | G01R 31/086 |
| 2021/0098985 | A1* | 4/2021 | Kim | H02H 7/22 |
| 2022/0109382 | A1* | 4/2022 | Ando | B60L 3/0069 |
| 2022/0109383 | A1* | 4/2022 | Ando | H02M 1/36 |

FOREIGN PATENT DOCUMENTS

| | | |
|---|---|---|
| JP | 2005184945 A | 7/2005 |
| JP | 2005354883 A | 12/2005 |
| JP | 2011108548 A | 6/2011 |
| JP | 2012215423 A | 11/2012 |
| JP | 2014196920 A | 10/2014 |
| JP | 2016046063 A | 4/2016 |
| KR | 100678437 B1 | 2/2007 |
| KR | 20070032863 A | 3/2007 |
| KR | 200436076 Y1 | 5/2007 |
| KR | 1020090045788 A | 5/2009 |
| KR | 20120035504 A | 4/2012 |
| KR | 20120086557 A | 8/2012 |
| KR | 20160061094 A | 5/2016 |
| KR | 20180094691 A | 8/2018 |

OTHER PUBLICATIONS

Written Opinion for related International Application No. PCT/KR2019/010474; report dated May 28, 2020; (5 pages).
Notice of Allowance for Korean Application No. 10-2018-0142925; report dated Feb. 20, 2020; (5 pages).
Office Action for Korean Application No. 10-2018-0142925; report dated Dec. 18, 2019; (8 pages).
Japanese Office Action for related Japanese Application No. 2021-519135; action dated May 10, 2022; (3 pages).

* cited by examiner

FIG. 2B
[COMPARISON BETWEEN VOLTAGE AND CURRENT WAVEFORMS DURING OCCURRENCE OF ELECTRIC LEAKAGE]
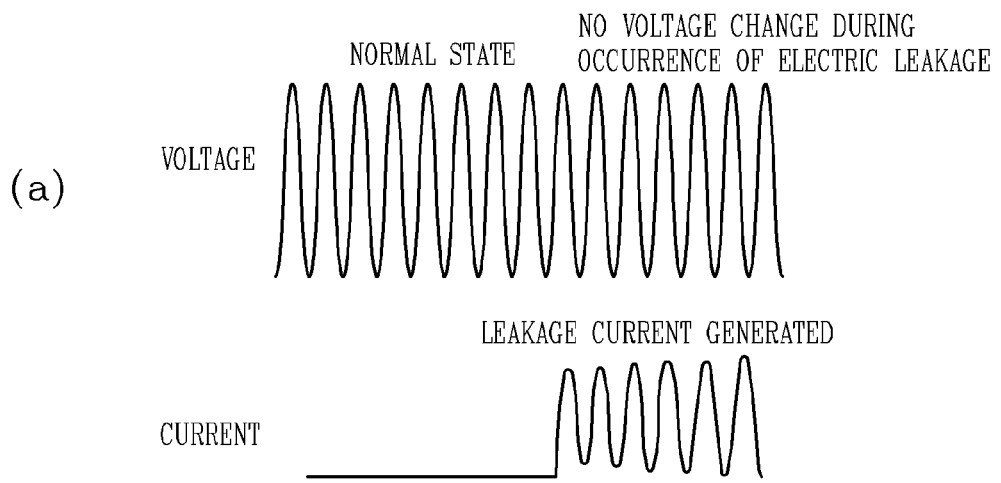
(a)
[COMPARISON BETWEEN VOLTAGE AND CURRENT WAVEFORMS DURING OCCURRENCE OF GROUND FAULT]
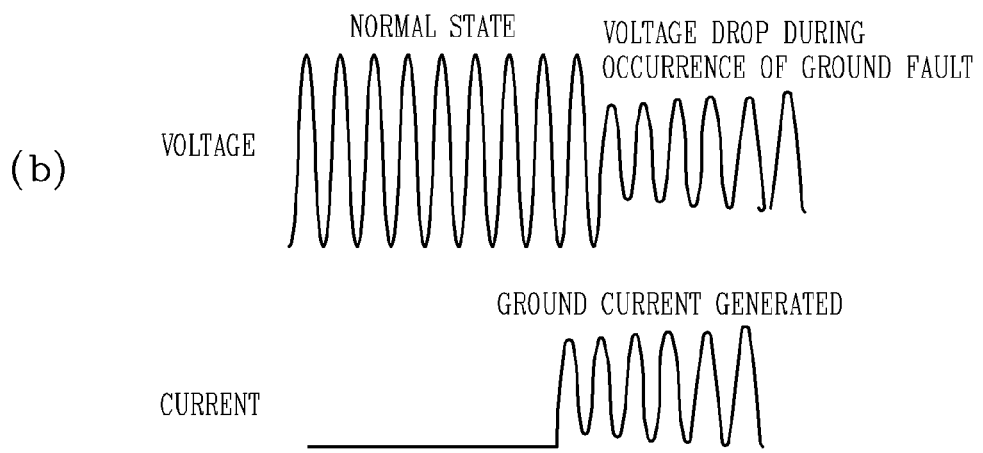
(b)

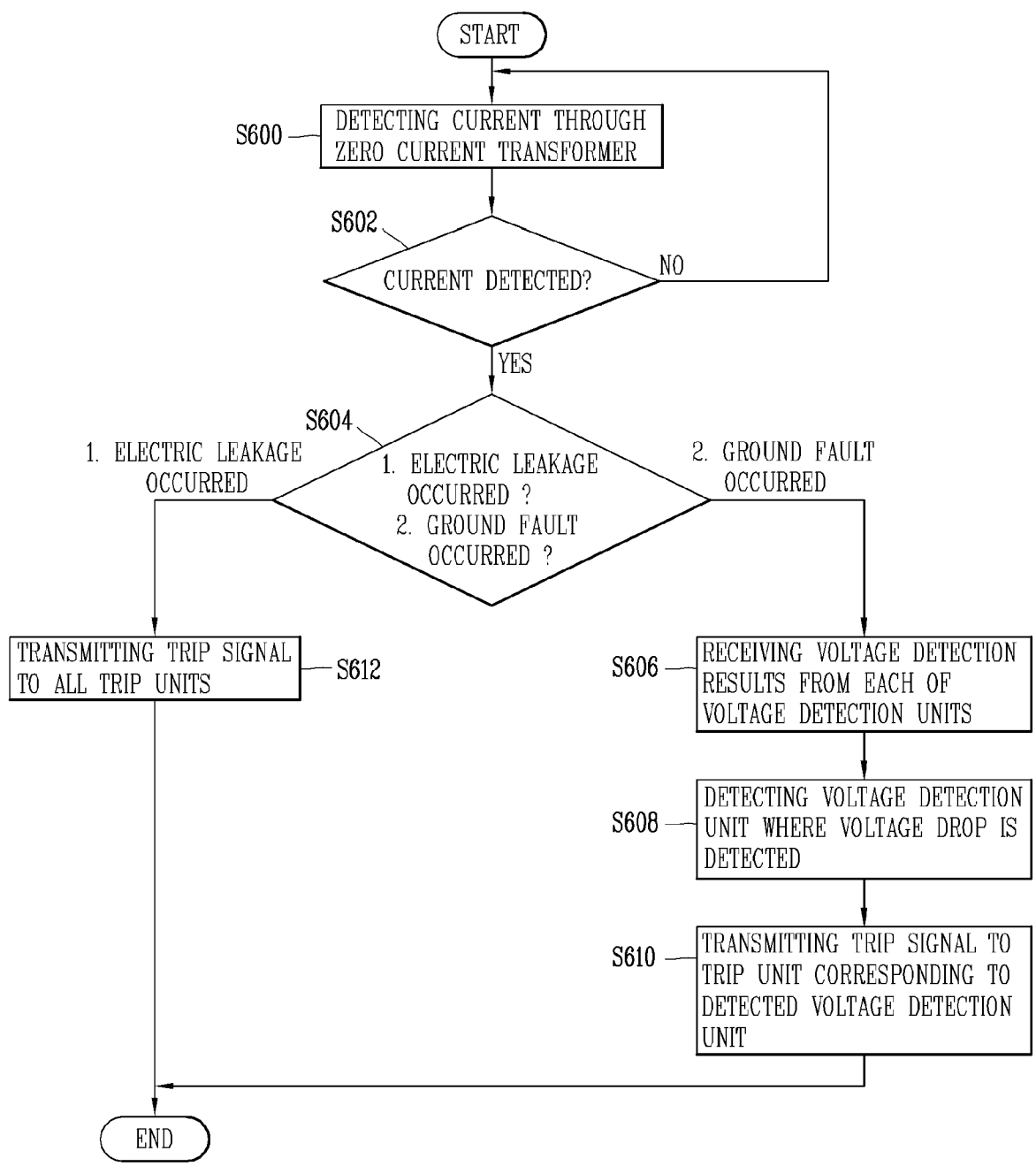

EARTH LEAKAGE BREAKER AND METHOD FOR CONTROLLING EARTH LEAKAGE BREAKER

CROSS-REFERENCE TO RELATED APPLICATIONS

This application is the National Stage filing under 35 U.S.C. 371 of International Application No. PCT/KR2019/010474, filed on Aug. 19, 2019, which claims the benefit of earlier filing date and right of priority to Korean Application No. 10-2018-0142925, filed on Nov. 19, 2018, the contents of which are all hereby incorporated by reference herein in their entirety.

FIELD

The present disclosure relates to an earth leakage circuit breaker (hereinafter referred to as earth leakage breaker) and a control method of the earth leakage breaker.

BACKGROUND

An earth leakage breaker is a device used to prevent a risk of electric shock due to electric leakage in an electrical line to which a load such as an electric machine mechanism is connected. For this, the earth leakage breaker may include a blocking unit to open and close a contact point between the electrical line and the load, and when electric leakage or ground fault is detected, the earth leakage breaker may perform trip operation of the blocking unit to block connection between the electrical line and the load.

Meanwhile, when the electrical line is supplied with alternating current three-phase power of R-phase, S-phase, and T-phase, the earth leakage breaker detects current through a zero current transformer (ZCT). Here, when current flowing through the three phases is normal, magnetic fluxes cancel each other and current is not detected by the zero current transformer, but when magnetic fluxes do not cancel each other, that is, when a phase of at least one of the three phases is changed or an amount of current flowing through at least one of the three phases is changed, current may be detected in the zero current transformer. Then, the earth leakage breaker detects, based on the detection result of the zero current transformer, that electric leakage or ground fault has occurred, and controls a blocking unit to trip a contact point to which the load is connected to thereby prevent electric shock accidents or fire due to the electric leakage or ground fault.

Meanwhile, when the load is three-phase loads, contact points may be formed at each of three-phase electrical lines so that power is supplied from each of the three-phase electrical lines. However, when single-phase loads 21, 22, and 23 are provided as illustrated in FIG. 1, contact points are formed at two-phase electrical lines among the three-phase electrical lines, and power may be supplied from the two-phase electrical lines.

However, when ground fault occurs in any one of three-phase alternating current electrical lines, since the related art earth leakage breakers 11, 12, and 13 control trip operation of a blocking unit based on a voltage detection result of a zero-phase transformer 10 for the overall three-phase electrical lines as described above, there is a problem in that all of the loads 21, 22, and 23 connected to the electrical lines are cut off from the electrical lines. In other words, when ground fault occurs in an S-phase electrical line among R-phase, S-phase, and T-phase electrical lines, even if an RT load 22 receives power from the R-phase and T-phase electrical lines in which no ground fault has occurred, the earth leakage breaker 12 connected to the RT load 22 trips contact points between the RT load 22 and the R-phase and T-phase electrical lines according to a current detection result of the zero-phase transformer 10.

SUMMARY

An aspect of the present disclosure is to solve the above-described problem by providing an earth leakage breaker and a method for controlling the earth leakage breaker that minimizes an effect of a power failure caused by ground fault occurred in a specific electrical line.

In addition, an aspect of the present disclosure is to solve the above-described problem by providing an earth leakage breaker and a method for controlling the earth leakage breaker that prevents trip operation for single-phase loads not receiving power from electrical lines in which ground fault has occurred.

To achieve these and other advantages and in accordance with the purpose of this specification, as embodied and broadly described herein, there is provided an earth leakage breaker formed between three-phase electrical lines and a single-phase load connected to two electrical lines of the three-phase electrical lines, wherein the earth leakage breaker is characterized by comprising: a zero-phase current detection unit for detecting a zero-phase current generated in a zero current transformer formed in the three-phase electrical lines; a voltage detection unit for detecting a voltage from each of the two electrical lines; a trip unit for tripping contact points between the two electrical lines and the single-phase load when a trip signal is inputted; and a control unit which, when the zero-phase current is detected by the zero-phase current detection unit, detects an electrical line, in which the voltage has dropped by a predetermined level or more, from among the two electrical lines on the basis of the voltage detection result of the voltage detection unit, and which generates the trip signal and outputs the trip signal to the trip unit when the electrical line in which the voltage has dropped by a predetermined level or more exists.

In one embodiment, the control unit is configured to, based on whether the detected zero-phase current is greater than or equal to a predetermined set value, detect an electrical line in which voltage has dropped by a predetermined level or more according to the voltage detection result and generate the trip signal based on the electrical line detection result to output the trip signal.

In one embodiment, the control unit is configured to, when the detected zero-phase current is less than a set value, which is a predetermined specific current value, determine whether the detected zero-phase current is caused by electric leakage, and when the zero-phase current is caused by electric leakage, generate the trip signal regardless of the electrical line detection result to output the trip signal.

In one embodiment, the zero-phase current detection unit includes a sensitivity selection circuit, wherein the sensitivity selection circuit includes a fixed connection resistance, a plurality of selective connection resistances, and a selection switch, and is configured to convert a zero-phase current inputted from the zero current transformer into a voltage signal based on a resistance value determined by a composite resistance of any one selective connection resistance selected by the selection switch and the fixed connection resistance, and wherein the control unit is configured to determine whether the zero-phase current is generated by electric leakage by comparing a threshold value, which is a specific voltage value determined according to the composite resistance, with a voltage value of the converted voltage signal.

In one embodiment, the control unit is configured to calculate a voltage value corresponding to the set value according to the composite resistance, and determine whether the detected zero-phase current is less than the set value based on a result of comparing the voltage value converted by the sensitivity selection circuit with the voltage value corresponding to the set value.

To achieve these and other advantages and in accordance with the purpose of this specification, as embodied and broadly described herein, there is provided a method for controlling an earth leakage breaker formed between three-phase electrical lines and a single-phase load connected to two electrical lines of the three-phase electrical lines, wherein the method includes a first step of detecting a zero-phase current generated in a zero current transformer formed in the three-phase electrical lines, a second step of detecting whether electric leakage or ground fault has occurred according to whether the detected zero-phase current is greater than or equal to a predetermined set value, a third step of detecting voltages of each of the two electrical lines when ground fault is detected as a result of the detection in the second step, a fourth step of detecting whether there is an electrical line in which voltage has dropped by predetermined level or more based on a result of the voltage detection in the third step, and a fifth step of tripping contact points between the two electrical lines and the single-phase load based on a result of the detection in the fourth step.

In one embodiment, the second step further includes a second-1 step of tripping the contact points between the two electrical lines and the single-phase load when electric leakage is detected in the second step.

In one embodiment, the fifth step further includes a fifth-1 step of delaying tripping for a predetermined time when an electrical line in which voltage has dropped by a predetermined level or more is detected in the fourth step.

In one embodiment, the second step is a step of, when a magnitude of the detected zero-phase current is greater than or equal to a predetermined set value, determining that the zero-phase current is caused by ground fault, and when the magnitude of the detected zero-phase current is less than the predetermined set value, determining whether electric leakage has occurred by comparing a predetermined threshold value for determining whether electric leakage has occurred with a voltage value of a voltage signal according to the magnitude of the detected zero-phase current.

To achieve these and other advantages and in accordance with the purpose of this specification, as embodied and broadly described herein, there is provided an earth leakage breaker system, including at least one single-phase load supplied with power from two electrical lines among three-phase electrical lines, at least one trip unit formed between a single-phase load and two electrical lines supplying power to the single-phase load and configured to trip contact points between the single-phase load and the two electrical lines supplying power to the single-phase load upon receiving a trip control signal, and a system control unit connected to a zero current transformer formed in the three-phase electrical lines and configured to receive a result of detecting voltages of electrical lines connected to each of single-phase loads from the at least one trip unit to thereby transmit the trip control signal to a part of the at least one trip unit based on the received voltage detection result.

In one embodiment, the trip unit includes a communication unit to perform communication connection with the system control unit, a voltage detection unit to detect voltages of each of two electrical lines supplying power to a single-phase load, and a blocking unit to trip contact points between the single-phase load and the two electrical lines supplying power to the single-phase load, wherein the communication unit is configured to transmit a voltage detection result of the voltage detection unit to the system control unit, and upon receiving the trip control signal from the system control unit, input the received trip control signal to the blocking unit.

In one embodiment, the system control unit is configured to, when a magnitude of the detected zero-phase current is determined to be greater than or equal to a set value by comparing the magnitude of the detected zero-phase current with the predetermined set value, detect a voltage detection unit which has detected voltage dropped by a predetermined level or more based on voltage detection results received from each of the trip units to thereby transmit a trip control signal to a trip unit corresponding to the detected voltage detection unit.

In one embodiment, the system control unit is configured to, when a magnitude of the detected zero-phase current is determined to be less than a set value by comparing the magnitude of the detected zero-phase current with the predetermined set value, determine whether the zero-phase current is generated due to electric leakage based on a threshold value for determining whether electric leakage has occurred, and when the zero-phase current is determined to be generated due to electric leakage, transmit a trip control signal to all of the at least one trip unit.

In one embodiment, the system control unit is configured to, when a zero-phase current is detected from the zero current transformer, request a voltage detection result from each of the at least one trip unit and receive the voltage detection result in response to the request.

In one embodiment, the blocking unit further includes a time delay unit to delay tripping of contact points between the two electrical lines and the single-phase load fora predetermined time upon receiving the trip control signal.

Hereinafter, effects of an earth leakage breaker and a method for controlling the earth leakage breaker according to the present disclosure will be described.

According to at least one of the embodiments of the present disclosure, the present disclosure has an advantage of preventing a single-phase load from being cut off from electrical lines in which ground fault has not occurred to thereby be supplied with power from the electrical lines, by blocking contact points connected to electrical lines according to a combination of a current detection result of a zero current transformer and a voltage detection result measured from contact points between a single-phase load and electrical lines.

According to at least one of the embodiments of the present disclosure, the present disclosure has an advantage of minimizing number of single-phase loads to which power supply is interrupted due to ground fault, by blocking only a load supplied with power from a specific electrical line in which ground fault has occurred.

BRIEF DESCRIPTION OF THE DRAWINGS

FIG. 2B is an exemplary view illustrating current and voltage detected during electric leakage and ground fault.

FIG. 6 is a flowchart illustrating an operation process of a system control unit in the earth leakage breaker system in FIG. 5.

DETAILED DESCRIPTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
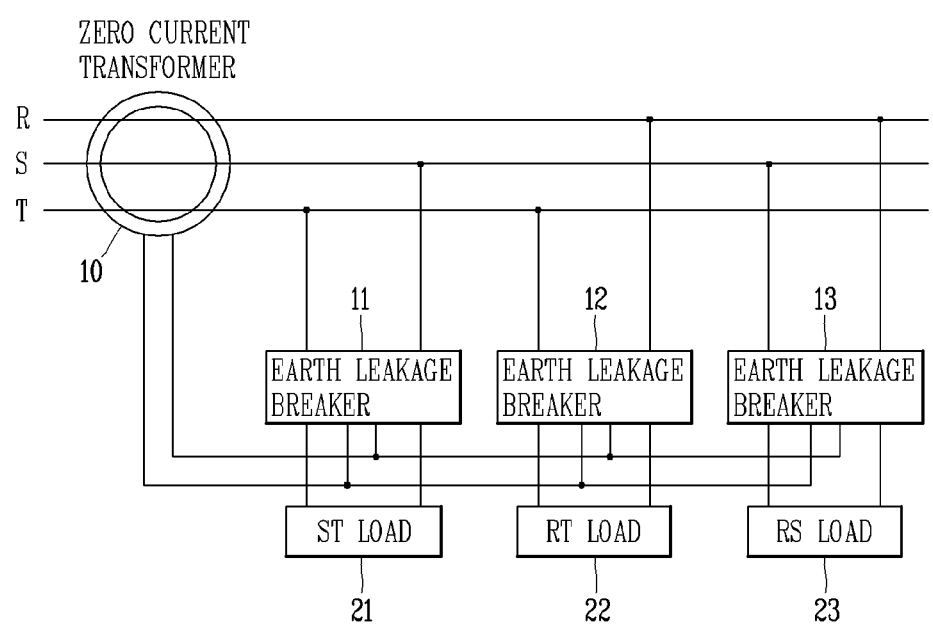
FIG. 1 is a block diagram illustrating a typical earth leakage breaker that is tripped according to a current detection result of a zero current transformer.
Figure 2A:
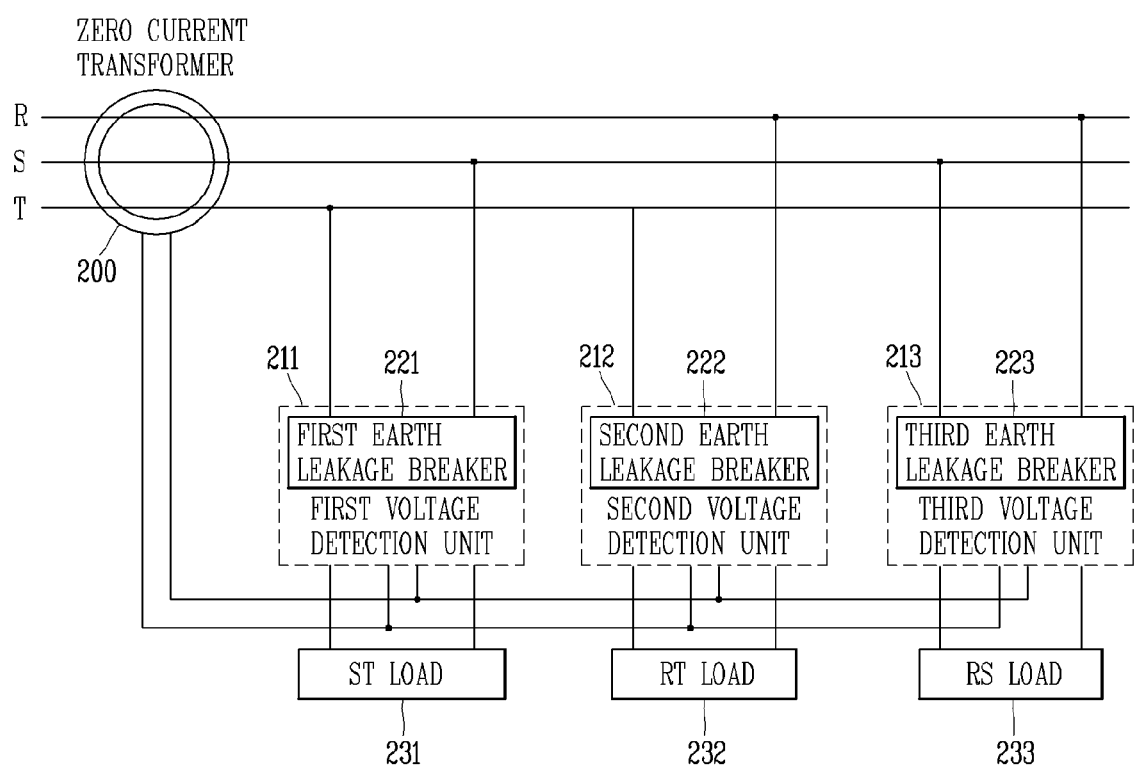
FIG. 2A is a block diagram illustrating an earth leakage breaker according to a first embodiment of the present disclosure.

First, FIG. 2A is a block diagram illustrating an earth leakage breaker according to a first embodiment of the present disclosure. And, FIG. 2B is an exemplary view illustrating current and voltage detected during electric leakage and ground fault.

Referring to FIG. 2A, the earth leakage breaker according to the first embodiment of the present disclosure may be connected to a single-phase load that receives power from two electrical lines among an R-phase electrical line, an S-phase electrical line, and a T-phase electrical line. Accordingly, the single-phase load may be any one selected from a load receiving power from the S-phase electrical line and the T-phase electrical line (hereinafter, ST load 231), a load receiving power from the R-phase electrical line and the T-phase electrical line (hereinafter, RT load 232), or a load receiving power from the R-phase electrical line and the S-phase electrical line (hereinafter, RS load 233). Therefore, in the following description, for convenience of explanation, a single-phase load receiving power from the three-phase electrical lines is assumed to be one of the ST load 231, the RT load 232, and the RS load 233.

Here, the single-phase load may be a distribution board configured to supply power received from two electrical lines to at least one electric machine mechanism. That is, when at least one electric machine mechanism is connected to the single-phase load, power received from two electrical lines connected to the single-phase load may be transmitted to the at least one electric machine mechanism.

Meanwhile, a zero current transformer 200 may detect a balanced state of current flowing through the three-phase electrical lines. Accordingly, when electric leakage or ground fault occurs in at least one of the three-phase electrical lines, the current balance may be broken due to the electric leakage or ground fault, and thus zero-phase current may be generated. Therefore, earth leakage breakers 211, 212, and 213 according to the embodiment of the present disclosure connected to the zero current transformer 200 may detect the zero-phase current generated from the zero current transformer 200 to thereby detect that the electric leakage or ground fault has occurred.

Meanwhile, when electric leakage occurs, leakage current is generated but voltage does not change in an electrical line in which the electric leakage has occurred, as shown in (a) of FIG. 2B. On the other hand, when ground fault occurs, voltage drops due to the ground fault and ground current is generated in an electrical line in which the ground fault has occurred, as shown in (b) of FIG. 2B. Accordingly, whether ground fault has occurred in an electrical line corresponding thereto may be detected based on voltage sensed from the electrical line. Therefore, in the present disclosure, when zero-phase current is generated, whether ground fault has occurred in an electrical line currently supplying power to a single-phase load may be determined by detecting whether there is an electrical line in which voltage drop has occurred among the electrical lines connected to the single-phase load, and only for a single-phase load receiving power from electrical lines where the ground fault has occurred, contact points between the electrical lines and the single-phase load may be tripped.

To this end, the earth leakage breaker according to the embodiment of the present disclosure may be provided for each of the single-phase loads 231, 232, and 233 receiving power from electrical lines. In addition, each of the earth leakage breakers 211, 212, and 213 may include a voltage detection unit to detect voltage of each of two electrical lines supplying power to a single-phase load connected thereto.

Accordingly, a first voltage detection unit 221 of a first earth leakage breaker 211 connected to the ST load 231 may detect voltages from the S-phase electrical line and the T-phase electrical line, respectively. In addition, a second voltage detection unit 222 of a second earth leakage breaker 212 connected to the RT load 232 may detect voltages from the R-phase electrical line and the T-phase electrical line, respectively. In addition, a third voltage detection unit 223 of a third earth leakage breaker 213 connected to the RS load 233 may detect voltages from the R-phase electrical line and the S-phase electrical line, respectively.

And, each of the earth leakage breakers 211, 212, and 213 may trip contact points between a single-phase load and electrical lines based on a result of detecting current from the zero current transformer 200 installed on the three-phase electrical lines (R-phase electrical line, S-phase electrical line, and T-phase electrical line), and based on voltage of each of the electrical lines detected by the voltage detection unit.

In more detail, when current is detected from the zero current transformer 200, the earth leakage breakers 211, 212, and 213 may further detect voltages of electrical lines that supply power to each of the single-phase loads. In addition, only when there exists an electrical line in which voltage detected has dropped by a predetermined level or more, contact points between a single-phase load and electrical lines supplying power to the single-phase load may be tripped.

To this end, the earth leakage breakers 211, 212, and 213 according to the first embodiment of the present disclosure each may include a control unit to output a trip signal based on detected voltage, a switching element to output a turn-on signal according to the trip signal, a trip coil magnetized by the switching element, and an opening/closing unit to trip contact points between a load and electrical lines by the trip coil.

Figure 3:
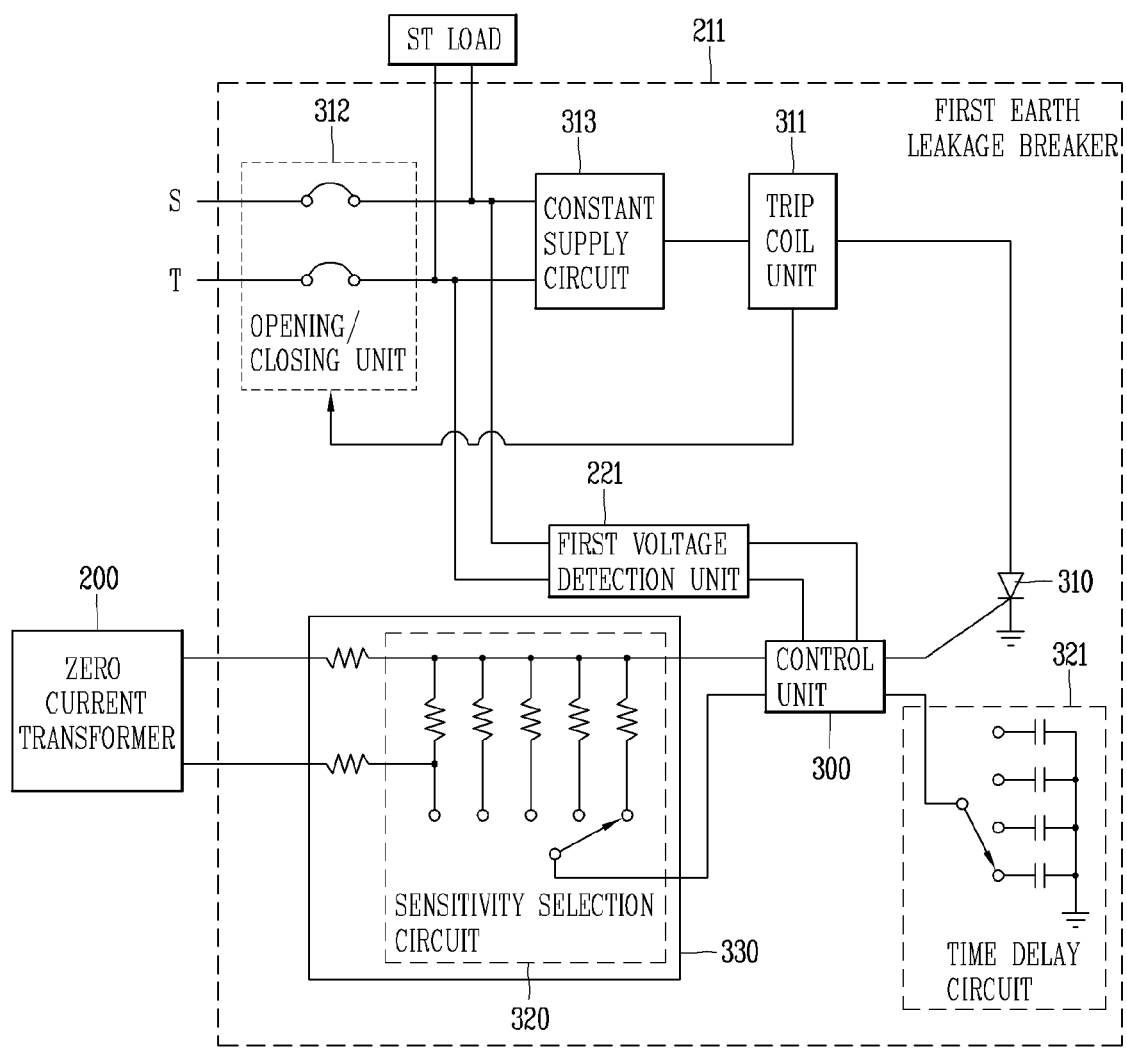
FIG. 3 is a detailed block diagram illustrating a structure of an earth leakage breaker according to a first embodiment of the present disclosure.

FIG. 3 is a block diagram illustrating a detailed structure of the earth leakage breaker according to the first embodiment of the present disclosure.

FIG. 3 is a block diagram illustrating a detailed configuration of the first earth leakage breaker 211 among the earth leakage breakers 211, 212, and 213.

Referring to FIG. 3, the first earth leakage breaker 211 may include a control unit 300, a zero-phase current detection unit 330, a first voltage detection unit 221, a switching element 310, a constant supply circuit 313, a trip coil unit 311, and an opening/closing unit 312. The first earth leakage breaker 211 may further include a time delay circuit 321.

The first voltage detection unit 221 may detect voltage from each of the S-phase electrical line and the T-phase electrical line supplying power to a current single-phase load, that is, the ST load 231 to thereby input a result of the voltage detection to the control unit 300.

Here, when a control signal is received from the control unit 300, the first voltage detection unit 221 may detect voltage of each phase electrical line supplying power to the single-phase load. Alternatively, regardless of a detection request from the control unit 300, voltage of each phase electrical line may be detected at all times.

Here, the first voltage detection unit 221 may be configured to be turned on according to a control of the control unit 300 in a turned-off state. Here, when current is detected at the zero current transformer 200, the control unit 300 may transmit a control signal to turn on the first voltage detection unit 221, and then may receive a result of voltage detection of each phase electrical line in response to the control signal.

The zero-phase current detection unit 330 may detect zero-phase current generated from the zero current transformer 200. In addition, the zero-phase current detection unit 330 may input a result of the zero-phase current detection to the control unit 300. Here, the result of the zero-phase current detection may be zero-phase current inputted from the zero current transformer 200. Then, the zero-phase current detection unit 330 may input the zero-phase current inputted from the zero current transformer 200 to the control unit 300.

Meanwhile, the zero-phase current detection unit 330 may include a sensitivity selection circuit 320. Here, the zero-phase current inputted from the zero current transformer 200 may be converted into a voltage signal in the sensitivity selection circuit 320. Then, as a result of the zero-phase current detection, the voltage signal may be inputted to the control unit 300. Then, the control unit 300 may detect a presence of the zero-phase current and a magnitude of the zero-phase current based on a voltage value of the inputted voltage signal.

In addition, when the zero-phase current is detected, the control unit 300 may detect whether there is an electrical line in which voltage has dropped by a predetermined level or more based on voltage detected by the first voltage detection unit 221. In addition, the control unit 300 may detect whether there is an electrical line in which voltage has dropped by a predetermined level or more based on a voltage detection result of each phase electrical line received from the first voltage detection unit 221. And, when there exists an electrical line in which voltage has dropped by a predetermined level or more, the control unit 300 may output a trip control signal.

For example, when the S-phase electrical line or the T-phase electrical line among the three-phase electrical lines is grounded, voltage detected at the S-phase electrical line or voltage detected at the T-phase electrical line may be dropped by a predetermined level or more based on a voltage detection result. Then, the control unit 300 may detect ground fault in the S-phase electrical line or the T-phase electrical line based on the voltage detection result to thereby output a trip control signal.

On the other hand, when there is no electrical line in which voltage has dropped by a predetermined level or more as a voltage detection result of each phase electrical line in a state where zero-phase current is detected at the zero current transformer 200, the control unit 300 may determine that ground fault has not occurred in electrical lines currently supplying power to a single-phase load. Accordingly, the control unit 300 may not output a trip control signal. Therefore, despite the current detection result of the zero current transformer 200, the single-phase load may maintain a state in which power is supplied from electrical lines.

Meanwhile, the switching element 310 may be configured as a semiconductor switch that is turned on or off according to a gate control signal, such as a thyristor. In addition, the switching element 310 may be connected to the control unit 300 and may receive the trip control signal as the gate control signal. Accordingly, the switching element 310 may be turned on when the trip control signal is outputted from the control unit 300.

Meanwhile, the trip coil unit 311 may include a trip coil that is magnetized when the switching element 310 is turned on. And, the trip coil unit 311 may further include an armature that moves by magnetic suction force when the trip coil is magnetized. In addition, the armature of the trip coil unit 311 may serve as a trigger so that the opening/closing unit 312 trips contact points between each of electrical lines and a load. Therefore, when the switching element 310 is turned on, the opening/closing unit 312 may trip contact points between each of electrical lines and a single-phase load. Here, the tripping may refer to as between each of electrical lines and a single-phase load is opened. In other words, a connection between the electrical line and the single-phase load may be cut off by opening the circuit.

Meanwhile, the constant supply circuit 313 may supply power that may magnetize the trip coil. The constant supply circuit 313, which is a circuit unit to convert alternating current power inputted from two phase electrical lines connected to the switching element 310 to provide direct current power, may include, for example, a diode bridge rectifier circuit and at least one voltage divider resistance providing output voltage of the rectifier circuit by stepping down the output voltage.

Meanwhile, when the trip signal is not outputted from the control unit 300, the switching element 310 may remain turned off. Accordingly, the trip coil may not be magnetized. Therefore, a state in which the single-phase load is supplied with power from the electrical lines may be maintained.

Meanwhile, the sensitivity selection circuit 320 may determine a threshold value for the control unit 300 to detect an occurrence of electric leakage. The sensitivity selection circuit 320 may include one fixed connection resistance, a plurality of selective connection resistances, and a selection switch. Here, resistance values of the plurality of selective connection resistances are different from each other, and may be selected to increase from a small value to a large value when the selection switch is moved in one direction.

Any one of the plurality of selective connection resistances may be selectively connected in parallel to the fixed connection resistance through the selection switch. In addition, the control unit 300 may determine the threshold value according to a selected selective connection resistance. For example, the threshold value may be determined according to a voltage value based on a resistance value of a fixed connection resistance, or a voltage value based on a composite resistance value of the fixed connection resistance and at least one selective connection resistance for a predetermined test signal. Here, since the fixed connection resistance is a fixed value, when a specific selective connection resistance is selected by the selection switch, the control unit 300 may determine a specific voltage value previously calculated based on the selected selective connection resistance as the threshold value.

Meanwhile, the fixed connection resistance of the sensitivity selection circuit 320 may be connected to an output terminal of the zero current transformer 200. Accordingly, when zero-phase current is outputted from the zero current transformer 200, a voltage signal according to the fixed connection resistance and any one selective connection resistance selected by the selection switch for the zero-phase current may be inputted to the control unit 300. Accordingly, the control unit 300 may determine whether electric leakage has occurred by comparing the inputted voltage signal with a currently determined threshold value.

Meanwhile, the earth leakage breaker according to an embodiment of the present disclosure may further include the time delay circuit 321 including condensers of different capacities. Here, the control unit 300 may turn on the switching element 310 by delaying a predetermined time when electric leakage is detected or ground fault is detected on at least one of the electrical lines connected to the single-phase load. Accordingly, the trip coil may be magnetized after the predetermined time has been delayed, and then contact points between the single-phase load and the electrical lines may be tripped.

Meanwhile, in FIG. 3, only the structure of the first earth leakage breaker 211 is mentioned, but it goes without saying that the second earth leakage breaker 212 and the third earth leakage breaker 213 may have a structure same as that of the first earth leakage breaker 211. However, the first earth leakage breaker 211 trips contact points between the S-phase and T-phase electrical lines and the ST load 231 based on the current detection result of the zero-phase transformer 200 and the voltage detection result of the S-phase and T-phase electrical lines, but the second earth leakage breaker 212 performs trip operation based on the current detection result of the zero-phase transformer 200 and the voltage detection result of the R-phase and T-phase electrical lines and the third earth leakage breaker 213 performs trip operation based on the current detection result of the zero-phase transformer 200 and the voltage detection result of the R-phase and S-phase electrical lines. Therefore, the only difference between the second earth leakage breaker 212 and the third earth leakage breaker 213 is the electrical lines connected to the single-phase load being the R-phase and T-phase electrical lines or the R-phase and S-phase electrical lines.

Figure 4:
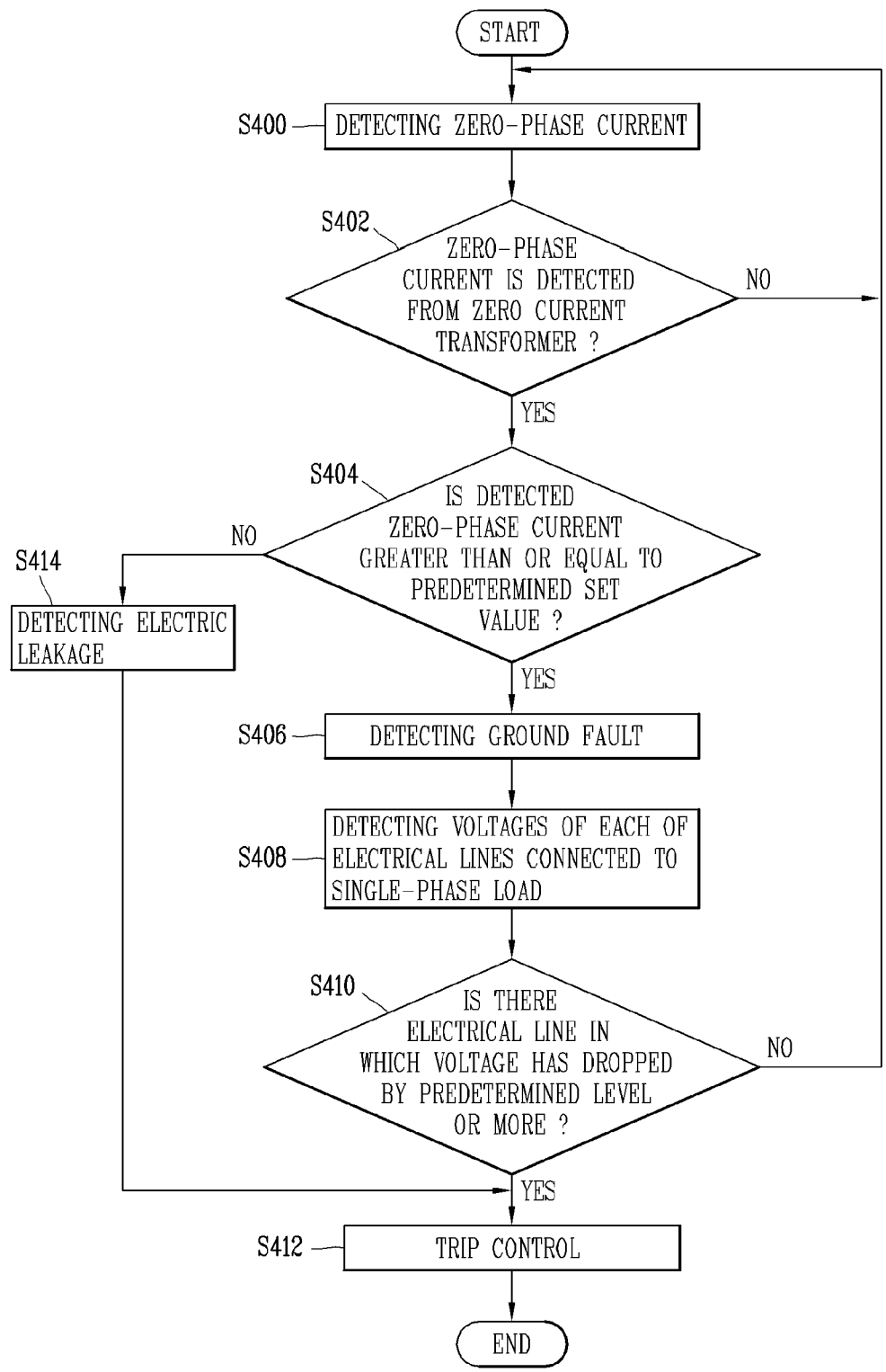
FIG. 4 is a flowchart illustrating an operation process of an earth leakage breaker according to a first embodiment of the present disclosure.

FIG. 4 is a flowchart illustrating an operation process of the earth leakage circuit breaker according to the first embodiment of the present disclosure. The control unit 300 described in FIG. 4 may be the control unit 300 of the first earth leakage breaker 211. However, as described above, since the second earth leakage breaker 212 and the third earth leakage breaker 213 differ only in the electrical lines connected to the single-phase load, it goes without saying that a control unit of the second earth leakage breaker 212 and a control unit of the third earth leakage breaker 213 may operate in a manner same as an operation process to be described in FIG. 4.

First, the control unit 300 may detect zero-phase current inputted from the zero current transformer 200 [S400]. For example, the control unit 300 may detect whether there is the zero-phase current based on whether there is a voltage signal inputted from the sensitivity selection circuit 320.

Meanwhile, the control unit 300 may determine whether zero-phase current is generated in the zero current transformer 200 as a result of detecting the zero-phase current [S402]. In addition, when it is determined that zero-phase current is not generated in the zero current transformer 200 [S402], the process goes back to the step [S400] to maintain detecting the zero-phase current.

On the other hand, when it is determined that zero-phase current is generated in the zero current transformer 200 [S402], whether a current value of the generated zero-phase current is less than a predetermined set value may be determined [S404].

However, when it is determined that the current value of the generated zero-phase current is less than the predetermined set value [S404], it may be determined that the zero-phase current is caused by electric leakage [S414]. Thereafter, the control unit 300 may output a trip control signal. Then, the switching element 310 is turned on, and the trip coil unit 311 and the opening/closing unit 312 perform trip operation, so that contact points between electrical lines supplying power to a single-phase load and the single-phase load are tripped [S412].

Here, a current value of the zero-phase current may be determined according to a voltage signal inputted from the sensitivity selection circuit 320. In this case, the control unit 300 may calculate a voltage value according to a fixed connection resistance and a currently selected selective connection resistance in the sensitivity selection circuit 320 for a current value corresponding to the set value, and compare a magnitude of the inputted voltage signal with a magnitude of the calculated voltage value to thereby determine whether the voltage value of the zero-phase current generated from the zero-phase transformer 200 is greater than or equal to the predetermined set value.

Here, the calculated voltage value may be greater than a threshold value for detecting an occurrence of electric leakage currently set in the sensitivity selection circuit 320. In this case, when the voltage value of the voltage signal inputted from the sensitivity selection circuit 320 is greater than the threshold value and less than the calculated voltage value, the control unit 300 may determine that electric leakage has occurred.

On the other hand, when the voltage value of the voltage signal inputted from the sensitivity selection circuit 320 is less than the threshold value, it may be determined that electric leakage has not occurred. In this case, the process goes back to the step [S400] to maintain detecting the zero-phase current.

However, when it is determined that the current value of the generated zero-phase current is greater than or equal to the predetermined set value [S404], it may be determined that the zero-phase current is caused by ground fault [S406]. For example, when the voltage value of the voltage signal inputted from the sensitivity selection circuit 320 is greater than or equal to the calculated voltage value, the control unit 300 may determine that ground fault has occurred.

On the other hand, when it is determined that the zero-phase current is generated due to ground fault, the control unit 300 may detect voltages of each of the electrical lines connected to the single-phase load [S408]. In addition, as a result of the detection in the step [S408], whether any of the electrical lines currently connected to the single-phase load has a voltage drop of more than a predetermined level may be determined [S410]. And, when it is determined that there is an electrical line in which voltage has dropped by a predetermined level or more among the electrical lines currently connected to the single-phase load [S410], the control unit 300 may go back to the step [S412] to output a trip control signal. Then, the switching element 310 is turned on, and the trip coil unit 311 and the opening/closing unit 312 perform trip operation, so that contact points between electrical lines supplying power to a single-phase load and the single-phase load are tripped.

Meanwhile, the step [S412] may further include a process of delaying tripping of the contact points between the electrical lines and the single-phase load for a predetermined time by the trip signal. Therefore, when the electric leakage is detected or when two conditions in which zero-phase current is detected from the zero current transformer 200 [S402] and there exists an electrical line in which voltage has dropped by a predetermined level or more [S410] are both satisfied, the control unit 300 may output a trip control signal after a predetermined time has been delayed. Accordingly, the single-phase load may be cut off from the electrical lines after a predetermined time has elapsed from a time point when electric leakage is detected or the two conditions in the steps [S402] and [S410] are both satisfied.

On the other hand, when it is determined that there is no electrical line in which voltage has dropped by a predetermined level or more among the electrical lines currently connected to the single-phase load [S410], the control unit 300 may go back to the step [S400] to maintain detecting zero-phase current. Therefore, even if ground fault occurs, the control unit 300 may not perform trip control when ground fault does not occur in electrical lines currently supplying power to a single-phase load. Accordingly, in the earth leakage breaker according to the embodiment of the present disclosure, single-phase loads receiving power from electrical lines where ground fault has not occurred may continue receiving power from the electrical lines.

In the above, an example in which earth leakage breakers each is connected to each of the single-phase loads and each of the earth leakage breakers is individually controlled by a control unit provided in each of the earth leakage breaker has been described. However, it goes without saying that the earth leakage breakers formed in each of the single-phase loads may be integrally controlled by one control unit. Here, each of the earth leakage breakers and the control unit may be connected in Internet Of Things (IOT) manner such as proximity communication or short-range communication. In addition, it goes without saying that each of the earth leakage breakers controlled by the integrated control unit may not include a control unit, but may only have a minimum configuration including a blocking unit for tripping electrical lines and single-phase loads, and a voltage detection unit for detecting voltages of each of the electrical lines supplying power to the single-phase loads.

Hereinafter, in order to distinguish from the first embodiment, an earth leakage breaker system in which a plurality of earth leakage breakers is integrally controlled by one control unit will be referred to as a second embodiment of the present disclosure. In addition, a control unit that controls a plurality of earth leakage breakers according to the second embodiment will be referred to as a system control unit in order to distinguish it from the control unit of the first embodiment. In the following description, the earth leakage breaker of the second embodiment, which does not include a control unit that controls trip operation, is referred to as a trip unit, and is distinguished from the earth leakage breaker of the first embodiment.

Figure 5:
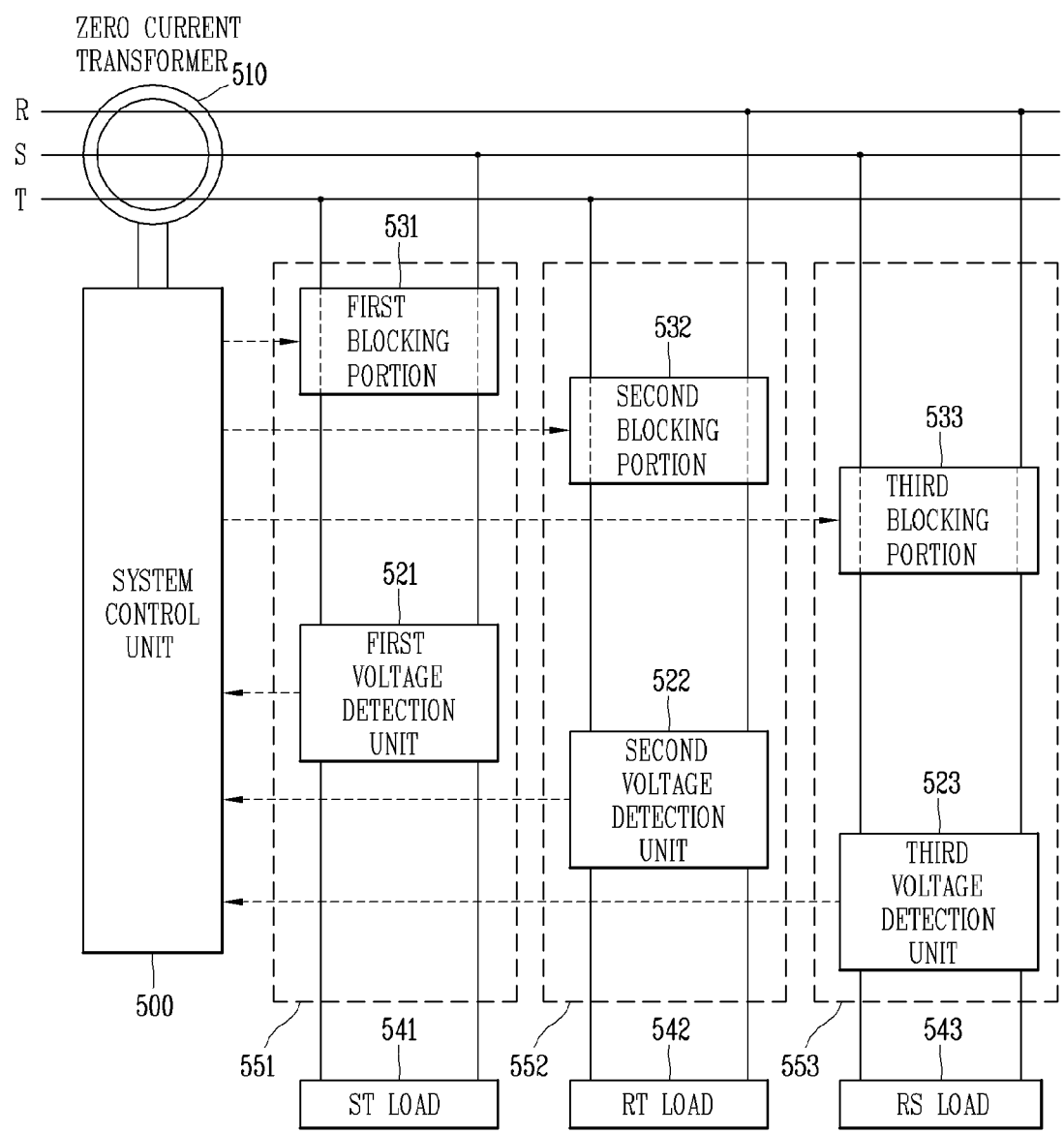
FIG. 5 is a block diagram illustrating an earth leakage breaker system according to a second embodiment of the present disclosure.

FIG. 5 is a block diagram illustrating the earth leakage breaker system according to the second embodiment of the present disclosure.

Referring to FIG. 5, the earth leakage breaker system according to the second embodiment of the present disclosure may include: a system control unit 500 connected to a zero current transformer 510 formed on three-phase electrical lines supplying R-phase, S-phase, and T-phase alternating current power; at least one of single-phase loads 541, 542, and 543 supplied with power from at least two electrical lines among the three-phase electrical lines; and at least one of trip units 551, 552, and 553 formed between each of the single-phase loads and electrical lines supplying power to the each of the single-phase loads and configured to trip contact points between a single-phase load and electrical lines supplying power to the single-phase load upon receiving a trip control signal.

Here, the system control unit 300 may detect an occurrence of zero-phase current from the zero current transformer 510 and determine an occurrence of electric leakage or ground fault based on a magnitude of the zero-phase current. In addition, when ground fault occurs, a voltage detection result may be received from each of the trip units 551, 552, and 553, and a trip control signal may be transmitted to a trip unit corresponding to an electrical line in which the ground fault has occurred according to the received voltage detection result. On the other hand, when electric leakage occurs, a trip control signal may be transmitted to all of the trip units 551, 552, and 553.

And, each of the trip units 551, 552, and 553 may be configured to transmit voltage detection results of each of electrical lines supplying power to a single-phase load to the system control unit 500 at a request of the system control unit 500, and perform trip operation according to a trip control signal received from the system control unit 500.

To this end, the trip units 551, 552, and 553 may be provided with a communication unit (not illustrated) capable of performing connection with the system control unit 500. And, the trip units 551, 552, and 553 may be provided with voltage detection units 521, 522, and 523 to detect voltages from each of electrical lines supplying power to a single-phase load, and blocking units 531, 532, and 533 to trip contact points between a single-phase load and electrical lines supplying power to the single-phase load.

Here, the blocking unit may include a switching element, a trip coil unit, a constant supply circuit, and an opening/closing unit. In addition, the blocking unit may further include a time delay circuit to delay a turn-on of the switching element when receiving a trip signal from the system control unit 500.

In addition, the communication unit may include at least one short-range communication module such as Bluetooth™, Radio Frequency Identification (RFID), and Infrared Data Association (IrDA).

Each of the trip units 551, 552, and 553 may be connected to the system control unit 500 through the communication unit. Accordingly, each of the voltage detection units 521, 522, and 523 may transmit a voltage detection result detected from each of electrical lines connected to a single-phase load to the system control unit 500. In addition, the communication unit may receive a trip control signal from the system control unit 500 and input the received trip control signal to each of the blocking units 531, 532, and 533. Then, the blocking unit receiving the trip control signal may trip contact points between a single-phase load and electrical lines supplying power to the single-phase load.

FIG. 6 is a flowchart illustrating an operation process of the system control unit in the earth leakage breaker system in FIG. 5.

Referring to FIG. 6, the system control unit 500 may detect zero-phase current from the zero current transformer 510 [S600]. For example, the system control unit 500 may be provided with a sensitivity selection circuit, and may determine whether there is zero-phase current based on whether zero-phase current converted into a voltage signal is inputted through the sensitivity selection circuit [S602]. However, when it is determined that zero-phase current is not detected [S602], the system control unit 500 may go back to the step [S600] to maintain detecting zero-phase current from the zero current transformer.

Meanwhile, when it is determined that zero-phase current is detected [S602], the system control unit 500 may determine whether the zero-phase current is caused by electric leakage or ground fault based on the detected zero-phase current [S604]. For example, when a magnitude of the generated zero-phase current is greater than or equal to a predetermined set value, the system control unit 500 may determine that the zero-phase current is generated by ground fault. On the other hand, when the magnitude of the generated zero-phase current is less than a predetermined set value, it may be determined that the zero-phase current is caused by electric leakage.

For example, a magnitude of the zero-phase current may be determined according to a voltage value inputted through the sensitivity selection circuit. Here, the system control unit 500 may calculate a voltage value according to a currently selected selective connection resistance, a fixed connection resistance, and the set value (or predetermined current value) in the sensitivity selection circuit, and compare the calculated voltage value with a voltage value of the voltage signal converted from the zero-phase current by the sensitivity selection circuit to thereby determine whether the zero-phase current is caused by electric leakage or ground fault.

Meanwhile, when it is determined that the zero-phase current is caused by electric leakage [S604], the system control unit 500 may transmit a trip control signal to all of the trip units 551, 552, and 553 [S612]. Then, the blocking units 531, 532, and 533 of each of the trip units 551, 552, and 553 may trip contact points between a single-phase load and electrical lines according to the received trip control signal.

Meanwhile, when it is determined that zero-phase current is caused by ground fault [S604], the system control unit 500 may receive voltage detection results from the voltage detection units 521, 522, and 523 of each of the trip units 551, 552, and 553 [S606]. Then, a voltage detection unit in which voltage has dropped by a predetermined level or more may be detected by the received voltage detection results [S608]. Thereafter, a trip control signal may be transmitted to at least one trip unit corresponding to the detected voltage detection unit [S610]. Accordingly, the trip control signal may be transmitted to some of the trip units 551, 552, and 553, and only the some of the trip units 551, 552, and 553 that have received the trip control signal may perform trip operation.

For example, when ground fault occurs in the S-phase electrical line among the three-phase electrical lines, the system control unit 500 may detect a change in current due to the ground fault from the zero current transformer 510. Then, the system control unit 500 may receive voltage detection results of each of the electrical lines from the voltage detection units 521, 522, and 523 of the first trip unit 551 of the ST load 541 receiving power from the S-phase and T-phase electrical lines, the second trip unit 552 of the RT load 542 receiving power from the R-phase and T-phase electrical lines, and the third trip unit 553 of the RS load 543 receiving power from the R-phase and S-phase electrical lines.

Therefore, when ground fault occurs in the S-phase electrical line as in the above-described example, the system control unit 500 may detect the first voltage detection unit 521 and the third voltage detection unit 523 that have detected the voltage of the S-phase electrical line based on the voltage detection result. Then, the system control unit 500 may transmit a trip control signal to each of the first trip unit 551 and the third trip unit 553 each corresponding to the first voltage detection unit 521 and the third voltage detection unit 523, respectively. Therefore, power supplied to the ST load 541 and the RS load 543 may be cut off according to the trip operation of the first blocking unit 531 and the third blocking unit 533. However, the RT load 542, which is not supplied with power from the S-phase electrical line, may maintain receiving power.

The present disclosure can be implemented as computer-readable codes in program-recorded media. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 20.

In addition, the computer may include the control unit. Therefore, the detailed description should not be limitedly construed in all of the aspects, and should be understood to be illustrative. All changes and modifications that fall within the metes and bounds of the claims, or equivalents of such metes and bounds are therefore intended to be embraced by the appended claims.

The invention claimed is:

1. An earth leakage breaker formed between three-phase electrical lines and a single-phase load connected to two electrical lines of the three-phase electrical lines, the earth leakage breaker comprising: a zero-phase current detection unit for detecting a zero-phase current generated in a zero current transformer formed in the three-phase electrical lines; a voltage detection unit for detecting a voltage from each of the two electrical lines; a trip unit for tripping contact points between the two electrical lines and the single-phase load when a trip signal is inputted; and a control unit which, when the zero-phase current is detected by the zero-phase current detection unit, detects an electrical line, in which the voltage has dropped by a predetermined level or more, from the two electrical lines based on the voltage detection result of the voltage detection unit, and which generates the trip signal and outputs the trip signal to the trip unit when the electrical line in which the voltage has dropped by the predetermined level or more exists, wherein the control unit is configured to, when the detected zero-phase current is less than a set value, which is a predetermined specific current value, determine whether the detected zero-phase current is caused by electric leakage, and when the zero-phase current is caused by the electric leakage, generate the trip signal regardless of the electrical line detection result to output the trip signal.

2. The earth leakage breaker of claim 1, wherein the control unit is configured to, based on whether the detected zero-phase current is greater than or equal to a predetermined set value, detect the electrical line in which voltage has dropped by the predetermined level or more according to the voltage detection result and generate the trip signal based on the electrical line detection result to output the trip signal.

3. The earth leakage breaker of claim 1, wherein the zero-phase current detection unit comprises a sensitivity selection circuit, wherein the sensitivity selection circuit comprises a fixed connection resistance, a plurality of selective connection resistances, and a selection switch, and is configured to convert the zero-phase current inputted from the zero current transformer into a voltage signal based on a resistance value determined by a composite resistance of any one selective connection resistance selected by the selection switch and the fixed connection resistance, and
wherein the control unit is configured to determine whether the zero-phase current is generated by the electric leakage by comparing a threshold value, which is a specific voltage value determined according to the composite resistance, with a voltage value of the converted voltage signal.

4. The earth leakage breaker of claim 3, wherein the control unit is configured to calculate a voltage value corresponding to the set value according to the composite resistance, and determine whether the detected zero-phase current is less than the set value based on a result of comparing the voltage value converted by the sensitivity selection circuit with the voltage value corresponding to the set value.

5. A method for controlling an earth leakage breaker formed between three-phase electrical lines and a single-phase load connected to two electrical lines of the three-phase electrical lines, the method comprising:
a first step of detecting a zero-phase current generated in a zero current transformer formed in the three-phase electrical lines;
a second step of detecting whether electric leakage or ground fault has occurred according to whether the detected zero-phase current is greater than or equal to a predetermined set value;
a third step of detecting voltages of each of the two electrical lines when ground fault is detected as a result of the detection in the second step;
a fourth step of detecting whether there is an electrical line in which voltage has dropped by predetermined level or more based on a result of the voltage detection in the third step; and
a fifth step of tripping contact points between the two electrical lines and the single-phase load based on a result of the detection in the fourth step,
wherein the second step is a step of,
when a magnitude of the detected zero-phase current is greater than or equal to a predetermined set value, determining that the zero-phase current is caused by ground fault, and
when the magnitude of the detected zero-phase current is less than the predetermined set value, determining whether the electric leakage has occurred by comparing a predetermined threshold value for determining whether the electric leakage has occurred with a voltage value of a voltage signal according to the magnitude of the detected zero-phase current.

6. The method of claim 5, wherein the second step further comprises:
a second-1 step of tripping the contact points between the two electrical lines and the single-phase load when the electric leakage is detected in the second step.

7. The method of claim 5, wherein the fifth step further comprises:
a fifth-1 step of delaying tripping for a predetermined time when the electrical line in which voltage has dropped by the predetermined level or more is detected in the fourth step.

8. An earth leakage breaker system, comprising: at least one single-phase load supplied with power from two electrical lines among three-phase electrical lines; at least one trip unit formed between a single-phase load and the two electrical lines supplying power to the single-phase load and configured to trip contact points between the single-phase load and the two electrical lines supplying power to the single-phase load upon receiving a trip control signal; and a system control unit connected to a zero current transformer formed on the three-phase electrical lines and configured to receive a result of detecting voltages of electrical lines connected to each of single-phase loads from the at least one trip unit to thereby transmit the trip control signal to a part of the at least one trip unit based on the received voltage detection result, wherein the system control unit is configured to, when a magnitude of the detected zero-phase current is determined to be less than a set value by comparing the magnitude of the detected zero-phase current with the predetermined set value, determine whether the zero-phase current is generated due to electric leakage based on a threshold value for determining whether the electric leakage has occurred, and when the zero-phase current is determined to be generated due to the electric leakage, transmit a trip control signal to all of the at least one trip unit.

9. The earth leakage breaker system of claim 8, wherein the trip unit comprises:
a communication unit to perform communication connection with the system control unit;
a voltage detection unit to detect voltages of each of two electrical lines supplying power to a single-phase load; and
a blocking unit to trip contact points between the single-phase load and the two electrical lines supplying power to the single-phase load, and
wherein the communication unit is configured to transmit a voltage detection result of the voltage detection unit to the system control unit, and upon receiving the trip control signal from the system control unit, input the received trip control signal to the blocking unit.

10. The earth leakage breaker system of claim 9, wherein the blocking unit further comprises a time delay unit to delay tripping of contact points between the two electrical lines and the single-phase load for a predetermined time upon receiving the trip control signal.

11. The earth leakage breaker system of claim 8, wherein the system control unit is configured to, when a magnitude of the detected zero-phase current is determined to be greater than or equal to a set value by comparing the magnitude of the detected zero-phase current with the predetermined set value, detect a voltage detection unit which has detected voltage dropped by a predetermined level or more based on voltage detection results received from each of the trip units to thereby transmit a trip control signal to a trip unit corresponding to the detected voltage detection unit.

12. The earth leakage breaker system of claim 8, wherein the system control unit is configured to, when a zero-phase current is detected from the zero current transformer, request a voltage detection result from each of the at least one trip unit and receive the voltage detection result in response to the request.

* * * * *